(12) United States Patent
Woodall

(10) Patent No.: US 10,750,760 B2
(45) Date of Patent: Aug. 25, 2020

(54) METHOD OF PRODUCING A BEVERAGE CONCENTRATE AND DEVICE FOR PRODUCING A TEA FROM SAME

(71) Applicant: Guy Woodall, Leatherhead (GB)

(72) Inventor: Guy Woodall, Leatherhead (GB)

( * ) Notice: Subject to any disclaimer, the term of this patent is extended or adjusted under 35 U.S.C. 154(b) by 263 days.

(21) Appl. No.: 15/555,191

(22) PCT Filed: Mar. 2, 2016

(86) PCT No.: PCT/GB2016/050544
§ 371 (c)(1),
(2) Date: Sep. 1, 2017

(87) PCT Pub. No.: WO2016/139470
PCT Pub. Date: Sep. 9, 2016

(65) Prior Publication Data
US 2018/0064126 A1   Mar. 8, 2018

(30) Foreign Application Priority Data

Mar. 3, 2015 (GB) .................................. 1503581.9
Jun. 8, 2015 (GB) .................................. 1509864.3
Nov. 27, 2015 (GB) .................................. 1520978.6

(51) Int. Cl.
*A23F 3/30* (2006.01)
*A23F 3/16* (2006.01)
(Continued)

(52) U.S. Cl.
CPC ................. *A23F 3/30* (2013.01); *A23F 3/163* (2013.01); *A23F 3/18* (2013.01); *A23F 5/243* (2013.01);
(Continued)

(58) Field of Classification Search
CPC .... A23F 3/30; A23F 3/163; A23F 3/18; A23F 5/243; A23F 5/26; A23F 5/267;
(Continued)

(56) References Cited

U.S. PATENT DOCUMENTS 3,119,695 A * 1/1964 Kahan ..................... A23F 5/243
426/232
4,051,267 A * 9/1977 Jongeling ............... A23F 3/163
426/330.3
(Continued)

FOREIGN PATENT DOCUMENTS

GB   1518794      6/1978
JP   02042941   *  2/1990
(Continued)

OTHER PUBLICATIONS

Hassan et al. Effect of Some Organic Acids on Some Fungal Growth. International Journal of Advances in Biology. vol. 2, No. 1; Feb. 2015. pp. 1-11.*
(Continued)

*Primary Examiner* — Anthony J Weier
(74) *Attorney, Agent, or Firm* — Fish IP Law, LLP

(57) ABSTRACT

A method of producing a beverage concentrate including contacting a plant material and/or plant extract with hot water to produce a beverage, wherein the concentration of the plant material and/or plant extract in the hot water is at least 100 grams per litre. The method further includes filtering the beverage to produce a filtrate, and producing a microbiologically stable beverage concentrate from the beverage or the beverage filtrate.

20 Claims, 2 Drawing Sheets

(51) Int. Cl.
*A23F 3/18* (2006.01)
*A23F 5/24* (2006.01)
*A23F 5/26* (2006.01)
*A23F 5/40* (2006.01)

(52) U.S. Cl.
CPC ............... *A23F 5/26* (2013.01); *A23F 5/267* (2013.01); *A23F 5/40* (2013.01); *A23V 2002/00* (2013.01); *A23V 2250/02* (2013.01); *A23V 2250/214* (2013.01)

(58) Field of Classification Search
CPC ... A23F 5/40; A23V 2002/00; A23V 2250/02; A23V 2250/214
See application file for complete search history.

(56) References Cited

U.S. PATENT DOCUMENTS

| | | | |
|---|---|---|---|
| 4,978,732 A | 12/1990 | Wehrmann et al. | |
| 4,996,070 A | 2/1991 | Nafisi-Movaghar | |
| 5,780,086 A | 7/1998 | Kirksey | |
| 6,036,982 A | 3/2000 | Lehmberg | |
| 6,962,104 B1* | 11/2005 | Podlucky | A47J 31/0615 99/275 |
| 2004/0028793 A1 | 2/2004 | Inaoka et al. | |
| 2004/0266917 A1* | 12/2004 | Lepage | C08K 3/22 523/223 |
| 2006/0201331 A1* | 9/2006 | Farr | A23L 2/40 99/275 |
| 2011/0217417 A1* | 9/2011 | Perlman | A23L 2/52 426/72 |
| 2017/0046904 A1* | 2/2017 | Studor | B67D 3/0003 |

FOREIGN PATENT DOCUMENTS

| | | | |
|---|---|---|---|
| JP | 2005287318 | * | 10/2005 |
| WO | 9414328 | | 7/1994 |
| WO | 2006015466 | | 2/2006 |
| WO | WO2012172379 | * | 12/2012 |

OTHER PUBLICATIONS

Crozier-Dodson et al. Formulating Food Safety. Process Control. Dec. 2004. https://www.foodsafetymagazine.com/magazine-archive1/december-2004january-2005/formulating-food-safety-an-overview-of-antimicrobial-ingredients/.*

Herbal Tea. Wikipedia. 2019. https://en.wikipedia.org/wiki/Herbal_tea.*

* cited by examiner

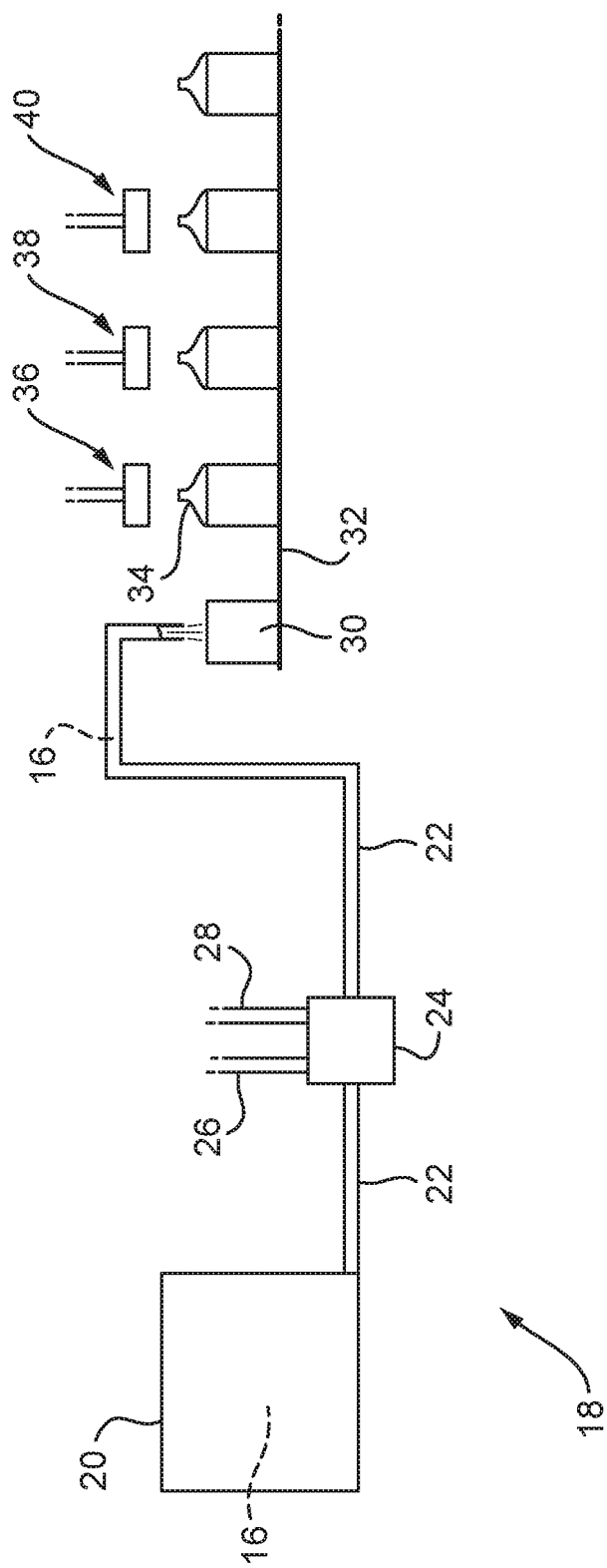

METHOD OF PRODUCING A BEVERAGE CONCENTRATE AND DEVICE FOR PRODUCING A TEA FROM SAME

This application is a U.S. National Phase application of PCT/GB/2016/050544, filed Mar. 2, 2016, which claims priority to Great Britain application 1503581.9, filed Mar. 3, 2015, Great Britain application 1509864.3, filed Jun. 8, 2015, and Great Britain application 1520978.6 filed Nov. 27, 2015. These and all other extrinsic materials discussed herein are incorporated by reference in their entirety.

FIELD OF THE INVENTION

The field of the invention is beverages, more specifically, methods for producing beverages, in particular hot beverages.

BACKGROUND

A number of methods for making instant tea from tea concentrates are known, but no commercially successful product has been found because consumers have rejected all prior attempts. Vending machines exist which dispense tea concentrates for making instant tea. However, a problem with these machines is that the tea that is produced by them tends to have poor flavour and aroma.

While instant coffee is widely accepted as a convenient, if inferior, substitute for freshly brewed coffee, instant tea has never achieved this status. Tea concentrates, from which instant tea can be made, are available as dried powders (analogous to instant coffee) and liquids. However, the dried powder concentrates produce instant tea with very poor flavour. With instant coffee the poorer flavour compared to freshly brewed coffee has been accepted as a reasonable compromise for the benefits of speed, convenience and low cost. However, dried instant tea has never caught on because the flavour is so inferior to freshly brewed tea. The liquid tea concentrates can sometimes offer a good approximation to the aroma of freshly brewed tea. However, while the aroma from these liquid extracts can be better than that from dried powder concentrates, the flavour of the tea that is produced is still very poor.

Concentrates for instant iced teas are commercially available. However, these rely on sugar to stabilise the iced tea concentrate. Many people choose to drink hot tea without sugar, and so any tea concentrate cannot rely on the use of sugar as a stabilising agent.

Tea cream is a phenomenon that develops in strong tea as it cools, where the tea becomes cloudy and drops a deposit. In the production of commercial tea concentrates, both dried powders and liquid extracts, the tea cream is seen as a problem that must be removed as cloudiness or deposits in any final tea drink are seen as a fault. There are a number of ways that this can be dealt with, including removal by centrifugation or precipitation, heating, ultrafiltration, or by precipitating with calcium chloride or bentonite, or by a number of oxidative or enzyme catalysed reactions. One of these processes is always performed before drying tea extract to make a powdered "instant tea" and nearly always also applied to liquid tea extract.

The problem is that key elements of the tea flavour, namely the tannins which give astringency, and the caffeine which gives the refreshing stimulant effect are concentrated in the precipitate which is removed. The characteristic aroma of tea is in the liquid fraction and this is retained, but the other elements are lost. Typically such tea extracts are used in compound drinks, such as iced teas or spiced chai, where their paucity of flavour is compensated for by other added flavour elements. Liquid tea extracts that are available commercially to the consumer, such as the US brand, "Walkers", have tea cream removed, and as a result have poor flavour. Attempts to commercialise them by direct sale to the consumer as instant tea have therefore had limited success.

SUMMARY OF THE INVENTION

Accordingly, there is a need to provide an improved tea concentrate which can be used to produce a tea that tastes the same as, or better than, a freshly brewed cup of tea. There is also a need to provide a sugar-free liquid tea concentrate for use in a vending machine, such that the concentrate can be mixed with hot water to produce tea that is indistinguishable from freshly brewed tea.

The present invention arises from the inventor's work in trying to overcome the problems associated with the prior art. The inventor has devised an elegant method for producing a concentrate for tea, coffee or a fruit infusion, which can be stored aseptically for extended periods of time, and which can be readily diluted, if necessary, with the appropriate amount of water in order to produce a consumable drink. The invention is especially concerned with methods for producing concentrates of hot tea, coffee or fruit and/or herb infusions, or the like, and the concentrates per se, which can be used privately for home consumption, or dispensed via a vending machine.

BRIEF DESCRIPTION OF THE DRAWINGS

FIG. 2 shows one embodiment of an aerosol production line.

DETAILED DESCRIPTION

Figure 1:
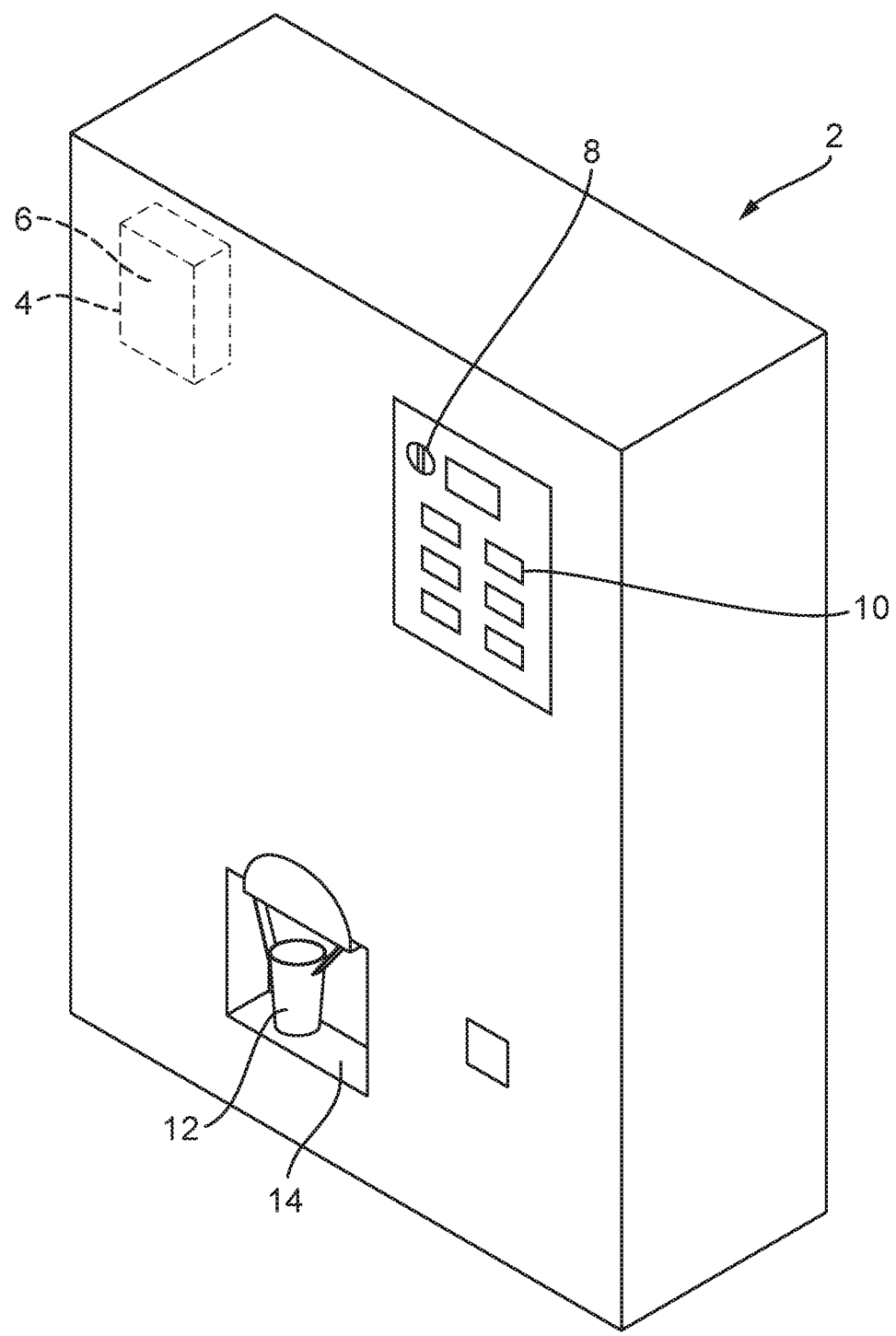
FIG. 1 is a drawing of a vending machine.

According to a first aspect of the invention, there is provided a method of producing a beverage concentrate, the method comprising:
    contacting a plant material and/or plant extract with hot water to produce a beverage, wherein the concentration of the plant material and/or plant extract in the hot water is at least 100 grams per litre;
    filtering the beverage to produce a filtrate; and
    producing a microbiologically stable beverage concentrate from the beverage or the beverage filtrate.

In one preferred embodiment, the beverage concentrate is a tea concentrate. It will be understood that the phrase "tea concentrate" can mean a liquid which can be diluted to produce tea for consumption. Preferably, the tea concentrate is a hot tea concentrate.

Hence, according to a second aspect of the invention, there is provided a method of producing a tea concentrate, the method comprising:
    contacting a plant material and/or plant extract with hot water to produce a tea, wherein the concentration of the plant material and/or plant extract in the hot water is at least 100 grams per litre;
    filtering the tea to produce a tea filtrate;
    contacting the tea or the tea filtrate with a stabiliser to retain tea cream in suspension; and
    producing a microbiologically stable tea concentrate from the tea or the tea filtrate.

In an alternative preferred embodiment, the beverage concentrate is a coffee concentrate. It will be understood that the phrase "coffee concentrate" can mean a liquid which can be diluted to produce coffee for consumption. Preferably, the coffee concentrate is a hot coffee concentrate.

In a further alternative embodiment, the beverage concentrate is a fruit and/or herb infusion concentrate. It will be understood that the phrase "fruit infusion concentrate" can mean a liquid which can be diluted to produce a fruit infusion for consumption. It will be understood that the phrase "herb infusion concentrate" can mean a liquid which can be diluted to produce a herb infusion for consumption. Similarly, it will be understood that the phrase "fruit and herb infusion concentrate" can mean a liquid which can be diluted to produce a fruit and herb infusion for consumption. The fruit and/or herb infusion concentrate may comprise a hot fruit and/or herb infusion concentrate or a cold fruit and/or herb infusion concentrate.

Generally, the beverage concentrate is not suitable for direct drinking until after it has been diluted. The beverage concentrate may be obtained by using a relatively high concentration of the plant material and/or plant extract in the hot water, as defined above. Accordingly, it is not necessary to further concentrate the liquid by reduced pressure evaporation or using any other further concentration processes.

Advantageously, the method of the invention provides a novel and elegant solution to the difficulties associated with preparing a microbiologically stable beverage concentrate with a long ambient shelf-life, and does so in a way that gives specific benefits to the consumer. These include a greatly improved taste so that the beverage produced using the concentrate does not need to be supplemented with additional flavours. The beverage concentrate does not need to comprise any added sugar, and the beverage concentrate may be conveniently stored for home use or in a vending machine.

Based on extensive research, the inventor discovered that there are three key issues which need to be addressed in order to produce a sugar-free tea concentrate, namely the tea cream, oxidative flavour deterioration and microbial spoilage. To produce a sugar-free coffee concentrate the inventor found it was also necessary to address the issues of solid deposits, which gradually form after some weeks' storage, oxidative flavour deterioration and microbial spoilage.

Preferably, the concentration of plant material and/or plant extract in the hot water is at least 150 grams per litre, more preferably at least 200 grams per litre, and most preferably at least 250, 300 or 350 grams per litre. In a preferred embodiment, the beverage concentrate is a tea concentrate and the concentration of the plant material and/or plant extract in the hot water is about 200 to 250 grams per litre. In an alternative preferred embodiment, the beverage concentrate is a coffee concentrate and the concentration of the plant material and/or plant extract in the hot water is about 200 to 400 grams per litre, more preferably above 250 to 350 gram per litre.

In a further alternative preferred embodiment, the beverage concentrate is a fruit and/or herb infusion concentrate and the concentration of the plant material and/or plant extract in the hot water is about 200 to 250 grams per litre.

In the embodiment in which the beverage concentrate is a tea concentrate, it will be appreciated that the plant material and/or plant extract could be collected from one or more plant species. The plant material may comprise a leaf, stem, fruit, root and/or flower. Examples of suitable plant materials may include the leaves and/or leaf buds of *Camellia sinensis*. The plant material may comprise white tea leaves, black tea leaves and/or green tea leaves. The plant material may comprise English breakfast tea leaves, earl grey tea leaves, jasmine tea leaves, lapsang tea leaves, Ceylon tea leaves, Darjeeling tea leaves and/or Assam tea leaves. Alternatively, or additionally, the plant material and/or plant extract may comprise elderflower petals, jasmine flowers, fresh nettles, rose hips, chamomile flowers, mint leaves and/or ginger.

In the embodiment in which the beverage concentrate is a coffee concentrate, it will be appreciated that the plant material and/or plant extract could be collected from one or more plant species. The plant material preferably comprises seeds or beans. Preferably, the seeds or beans are from a plant of the *Coffea* genus. The seeds or beans may be from the *Coffea arabica* or the *Coffea canephora*. The seeds or beans may be processed and roasted. The seeds or beans are preferably ground.

In the embodiment in which the beverage concentrate is a fruit and/or herb infusion concentrate, it will be appreciated that the plant material and/or plant extract could be collected from one or more plant species. The plant material preferably comprises fruit. The fruit may comprise fresh fruit, but preferably comprises dried fruit. The fruit may comprise pineapple, kiwi, apple, pear, coconut, cucumber, strawberry, raspberry, cherry, blueberry, blackcurrant, blackberry, plum, sour plum, hawthorn berry gooseberry, guava, hibiscus, grape, mango, melon, and/or citrus fruit. Melon may comprise water melon, papaya, galia melon, cantaloupe melon and/or honeydew melon. Citrus fruit may comprise orange, lemon, lime and/or grapefruit. Additionally or alternatively, the plant material may comprise a herb. The herb may comprise a fresh herb or a dried herb. The herb may comprise rosemary, mint, basil, parsley, coriander, nettles and/or lavender. The plant material may comprise flower petals, such as rose petals, elderflower petals, jasmine flowers, chamomile flowers, and/or sweet osmanthus flowers.

A plant extract may comprise essential oil obtained from the plant. The essential oil may be obtained from the flower, fruit, roots, leaves and/or stem of the plant. The essential oil may be obtained by expression, absorption, maceration and/or distillation. Examples of suitable plant extracts may include extracts from flowers, spices, nuts, herbs and/or fruits. Suitable plant extracts may comprise mint extract, peppermint extract, almond extract, bergamot extract, cinnamon extract, cloves extract, ginger extract, lemon extract, pistachio extract, rose extract, spearmint extract, vanilla extract, violet extract and/or wintergreen extract.

Preferably, the hot water contacted with the plant material and/or plant extract is at least 50° C., more preferably at least 60° C., and most preferably at least 70° C. or at least 80° C.

Preferably, the beverage is filtered while the beverage is still warm. It may be understood that the beverage is considered to be warm when it is at least 30° C., 40° C., 50° C., 60° C., 70° C., 80° C. or 90° C. However, in a preferred embodiment the beverage is considered to be warm when it is at least 60° C., 70° C., 80° C. or 90° C.

The step of filtering the beverage may comprise straining the beverage and/or coarse-filtering the beverage. Preferably, the step of filtering the beverage comprises straining the beverage and coarse-filtering the beverage.

In the embodiment in which the beverage concentrate is a tea concentrate, the method described herein involves making a strong brew of tea, and the result is that the tea cream formation is heavy due to the very high strength of the brew. It first turns cloudy, looking as though milk has been added, and then separates into two fractions, a clear or at least clearer liquid fraction, and a deposit. Prior art approaches remove the tea cream as the cloudiness and deposits in the final tea drink are seen as a fault. In stark contrast, the approach to the tea cream in the method of the invention is to set aside the notion that the cream is a problem that has to be dealt with, and instead to welcome it as a natural and necessary part of the tea. Nevertheless, the cloudiness and deposits are unacceptable so they must be dealt with. Hence, the cloudiness created by the tea cream must be held in suspension with the stabiliser, thereby preventing the formation of a deposit.

Preferably, the method comprises a step of contacting the beverage or the beverage filtrate with a stabiliser to retain a solid in suspension.

Preferably, this step is conducted in the embodiments where the beverage concentrate is a tea concentrate or a coffee concentrate. This step may be conducted in the embodiment where the beverage concentrate is a fruit and/or herb infusion concentrate.

Preferably, this step is conducted subsequent to the step of filtering the beverage.

There are a number of stabilisers which may be used to retain the solid in suspension. The stabiliser may comprise a carrageenan. The carrageenan may be kappa carrageenan, iota carrageenan or lamba carrageenan. Preferably, the carrageenan is iota carrageenan. Alternatively, the stabiliser may comprise a suitable gum. The stabiliser may comprise locust bean gum, oat gum, guar gum, tragacanth, acacia gum, xanthan gum, karaya gum, tara gum, gellan gum or gum ghatti. Preferably, the stabiliser comprises iota carrageenan, xanthan gum or guar gum. Most preferably, however, the stabiliser comprises xanthan gum. Advantageously, xanthan has no taste or mouthfeel which is detectable to the palate after dilution.

The amount of the stabiliser added to the beverage or the beverage filtrate may comprise between 0.1 and 10 grams of stabiliser per litre of beverage filtrate. Preferably, the amount of stabiliser added to the beverage or the beverage filtrate comprises between 0.2 and 7.5 grams of stabiliser per litre of beverage filtrate. More preferably, the amount of stabiliser added to the beverage or the beverage filtrate comprises between 0.3 and 5 grams, 0.4 and 4 grams, or 0.5 and 5 grams of stabiliser per litre of beverage filtrate. Most preferably, the amount of stabiliser used comprises about 2 gram of stabiliser per litre of beverage filtrate.

The method may comprise removing pectin from the beverage or beverage filtrate. The method may comprise a step of removing pectin in the embodiment in which the beverage concentrate is a fruit and/or herb infusion. More preferably, the method may comprise a step of removing pectin wherein the fruit and/or herb infusion is made using a fruit selected from the group comprising a pear; an apple; a guava; a plum; a sour plum; a gooseberry; and/or a citrus fruit.

The step of removing pectin from the beverage or beverage filtrate may comprise contacting the beverage or the beverage filtrate with a pectolytic enzyme, or pectinase. The beverage or beverage filtrate may be brought to a temperature of between 0° C. and 60° C., more preferably between 10° C. and 50° C. or between 20° C. and 40° C., most preferably between 25° C. and 35° C. prior to contacting the beverage or the beverage filtrate with the pectolytic enzyme.

Advantageously, at a temperature of about 30° C. the inventors have found that pectolytic enzyme has optimal effect. The enzyme causes the beverage or beverage filtrate to separate into a clear liquid fraction and an opaque pectin based flocculation.

Subsequent to the step of contacting the beverage or the beverage filtrate with a pectolytic enzyme the method may comprise separating a liquid phase of the beverage or the beverage filtrate from any solids dispersed therein. The step of separating the liquid phase of the beverage or the beverage filtrate from any solids dispersed therein may comprise racking the beverage or the beverage filtrate. The step of separating the liquid phase of the beverage or the beverage filtrate from any solids dispersed therein may comprise filtering the beverage or the beverage filtrate. Most preferably, the step of separating the liquid phase of the beverage or the beverage filtrate from any solids dispersed therein comprises racking and then filtering the beverage or the beverage filtrate.

In a first embodiment, the step of producing a microbiologically stable beverage concentrate from the tea or the tea filtrate in the method of the first aspect may comprise contacting the beverage or the beverage filtrate with one or more preservative. The inventor believes that this is an important aspect of the invention.

Hence, according to a third aspect of the invention, there is provided a method of producing a beverage concentrate, the method comprising:
    contacting a plant material and/or plant extract with hot water to produce a beverage, wherein the concentration of the plant material and/or plant extract in the hot water is at least 100 grams per litre;
    filtering the beverage to produce a beverage filtrate;
    contacting the beverage or beverage filtrate with a stabiliser to retain solids in suspension; and
    contacting the beverage or the filtrate with one or more preservative to thereby produce a microbiologically stable beverage concentrate.

This method is especially important for tea.

Hence, according to a fourth aspect of the invention, there is provided a method of producing a tea concentrate, the method comprising:
    contacting a plant material and/or plant extract with hot water to produce a tea, wherein the concentration of the plant material and/or plant extract in the hot water is at least 100 grams per litre;
    filtering the tea to produce a tea filtrate;
    contacting the tea or the tea filtrate with a stabiliser to retain tea cream in suspension; and
    contacting the tea or the tea filtrate with one or more preservative to thereby produce a microbiologically stable tea concentrate.

Preferably, the one or more preservative does not comprise sugar.

In one preferred embodiment, the one or more preservative may comprise an antioxidant. The antioxidant may comprise an ascorbate, a tocopherol, a gallate, an erythorbate and/or a phosphate. Preferably, the antioxidant comprises an ascorbate. The ascorbate may comprise ascorbic acid, sodium ascorbate, calcium ascorbate, potassium ascorbate, fatty acid esters of ascorbic acid or ascorbyl state. In a preferred embodiment, the antioxidant comprises ascorbic acid.

The amount of the antioxidant added to the beverage or tea or the beverage filtrate or tea filtrate may comprise between 0.5 and 50 grams of antioxidant per litre of beverage/tea filtrate. Preferably, the amount of antioxidant added to the beverage or tea or the beverage/tea filtrate comprises between 1 and 25 grams of antioxidant per litre of beverage/tea filtrate. More preferably, the amount of antioxidant added to the beverage or tea or the beverage/tea filtrate comprises between 2 and 20 grams, or 3 and 15 grams of antioxidant per litre of beverage/tea filtrate. Most preferably, the amount of antioxidant used comprises between about 4 and 10 grams of antioxidant per litre of beverage/tea filtrate.

In a preferred embodiment, the beverage concentrate is a tea concentrate and the amount of antioxidant used comprises between about 4 and 10 grams of antioxidant per litre of tea filtrate.

In an alternative preferred embodiment, the beverage concentrate is a coffee concentrate and the amount of antioxidant used comprises between about 0.1 and 10 grams of antioxidant per litre of coffee filtrate, preferably between about 0.25 and 5 grams of antioxidant per litre of coffee filtrate, most preferably between about 0.5 and 2 grams of antioxidant per litre of coffee filtrate.

In a further alternative preferred embodiment, the beverage concentrate is a fruit and/or herb infusion concentrate and the amount of antioxidant used comprises between about 0.1 and 50 grams of antioxidant per litre of fruit and/or herb infusion filtrate, preferably between about 1 and 25 grams of antioxidant per litre of fruit and/or herb infusion filtrate, most preferably between about 4 and 10 grams of antioxidant per litre of fruit and/or herb infusion filtrate.

The one or more preservative may comprise an antimicrobial agent. The antimicrobial agent may comprise an antifungal agent and/or an antibacterial agent. Preferably, the antimicrobial agent comprises an antifungal agent and an antibacterial agent. The antifungal agent may comprise a sorbate. The sorbate may comprise sorbic acid, sodium sorbate, potassium sorbate or calcium sorbate. The antibacterial agent may comprise a benzoate. The benzoate may comprise benzoic acid, sodium benzoate, potassium benzoate, calcium benzoate, ethylparaben, sodium ethyl parahydroxybenzoate, propylparaben, sodium propyl para-hydroxybenzoate, methylparaben or sodium methyl parahydroxybenzoate. Preferably, the antimicrobial agent comprises potassium sorbate and/or sodium benzoate. Most preferably, the antimicrobial agent comprises potassium sorbate and sodium benzoate.

Advantageously, the potassium sorbate is effective against yeast and mould and the sodium benzoate is effective against bacteria.

The amount of the antimicrobial agent added to the beverage or the beverage filtrate may comprise between 100 and 3000 milligrams of the antimicrobial agent per litre of beverage filtrate. Preferably, the amount of the antimicrobial agent added to the beverage or the beverage filtrate comprises between 200 and 2500 milligrams of the antimicrobial agent per litre of beverage filtrate. More preferably, the amount of the antimicrobial agent added to the beverage or the beverage filtrate comprises between 500 and 2250 milligrams of the antimicrobial agent per litre of beverage filtrate. Most preferably, the amount of the antimicrobial agent used comprises between about 750 and 2000 milligrams of the antimicrobial agent per litre of beverage filtrate.

In embodiments where the antimicrobial agent comprises an antifungal agent and an antibacterial agent then it will be understood that the combined amount of antifungal agent and the antibacterial agent added to the beverage or beverage filtrate may comprise the total amount of antimicrobial agent added to the beverage concentrate.

Accordingly, the amount of the antifungal agent added to the beverage or the beverage filtrate may comprise between 100 and 1500 milligrams of the antifungal agent per litre of beverage filtrate. Preferably, the amount of the antifungal agent added to the beverage or the beverage filtrate comprises between 250 and 1250 milligrams of the antifungal agent per litre of beverage filtrate. Most preferably, the amount of the antifungal agent added to the beverage or the beverage filtrate comprises between 500 and 1000 milligrams of the antifungal agent per litre of beverage filtrate.

Similarly, the amount of the antibacterial agent added to the beverage or the beverage filtrate may comprise between 100 and 1500 milligrams of the antibacterial agent per litre of beverage filtrate. Preferably, the amount of the antibacterial agent added to the beverage or the beverage filtrate comprises between 250 and 1250 milligrams of the antibacterial agent per litre of beverage filtrate. Most preferably, the amount of the antibacterial agent added to the beverage or the beverage filtrate comprises between 500 and 1000 milligrams of the antibacterial agent per litre of beverage filtrate.

To enable the antimicrobial agent to function it may be advantageous to lower the pH of the beverage concentrate. Accordingly, the method may comprise a step of adding an acid to the beverage or the beverage filtrate. It will be understood that any suitable food grade acid may be used, such as citric acid, malic acid, tartaric acid, ascorbic acid and/or phosphoric acid. Preferably, the acid comprises ascorbic acid and/or phosphoric acid. Ascorbic acid however is preferred.

Advantageously, where ascorbic acid is used then the ascorbic acid acts as an antioxidant as well as lowering the pH of the beverage concentrate. It will be understood that in embodiments where the one or more preservative comprises an antioxidant and the antioxidant comprises an acid then it only needs to be added to the beverage concentrate once but will serve two functions.

In embodiments where the antioxidant does not comprise an acid or the one or more preservative do not comprise an antioxidant then the acid may be added to the beverage or the beverage filtrate in a separate step. Alternatively, in some embodiments, where the antioxidant does comprise an acid an additional acid may be added to the beverage or the beverage filtrate in a separate step. The additional acid may comprise any suitable food grade acid, as defined above. However, preferably the additional acid may comprise citric acid. The step of adding an additional acid may be used in embodiments where the beverage concentrate is a fruit and/or herb infusion concentrate.

Advantageously, the additional acid can give the fruit and/or herb infusion a desirable acidic taste. Additionally, the additionally acid can provide additional protection from oxidation. The amount of the acid added to the beverage or the beverage filtrate may comprise between 0.5 and 50 grams of acid per litre of beverage filtrate. Preferably, the amount of acid added to the beverage or the beverage filtrate comprises between 1 and 25 grams of acid per litre of beverage filtrate. More preferably, the amount of acid added to the beverage or the beverage filtrate comprises between 2 and 20 grams, or 3 and 15 grams of acid per litre of beverage filtrate. Most preferably, the amount of acid used comprises between about 4 and 10 grams of acid per litre of beverage filtrate. In a preferred embodiment, the beverage concentrate is a tea concentrate and the amount of the acid added to the tea concentrate comprises between about 4 and 10 grams of acid per litre of tea filtrate.

In an alternative preferred embodiment, the beverage concentrate is a coffee concentrate and the amount of the acid added to the coffee concentrate comprises between about 0.1 and 10 grams of acid per litre of coffee filtrate, preferably between about 0.25 and 5 grams of acid per litre of coffee filtrate, most preferably between about 0.5 and 2 grams of acid per litre of coffee filtrate.

In a further alternative preferred embodiment, the beverage concentrate is a fruit and/or herb infusion concentrate and the amount of the acid added to the fruit and/or herb infusion concentrate comprises between about 0.1 and 50 grams of acid per litre of fruit and/or herb infusion filtrate, preferably between about 1 and 25 grams of acid per litre of fruit and/or herb infusion filtrate, most preferably between about 4 and 10 grams of acid per litre of fruit and/or herb infusion filtrate.

Preferably, the step of adding an acid to the beverage or beverage filtrate causes the pH of the beverage or beverage filtrate to be reduced to a pH of below 4.5, and preferably to a pH below 4.3.

Preferably, the method comprises filling a container with the beverage concentrate for storage. Preferably, the step of filling the container comprises hot filling the container. Accordingly, the step may comprise raising the temperature of the beverage concentrate such that immediately prior to the transfer of the beverage concentrate into the container the temperature of the beverage concentrate is preferably at least 72° C., more preferably at least 75° C. and most preferably at least 80° C. The temperature of the beverage concentrate can be raised using a heat exchange unit. Advantageously, hot filling further reduces the risk of microbial contamination.

In a second embodiment, however, the step of producing a microbiologically stable beverage or tea concentrate from the beverage or the beverage filtrate in the method of the first aspect may comprise filling an aerosol container with the beverage or the beverage filtrate, displacing oxygen in a headspace with an inert gas and sealing the aerosol container. Preferably, the sealing step comprises vacuum crimping.

Advantageously, the aerosol container maintains the beverage concentrate in an anaerobic and sterile environment throughout the life of the product as it is consumed, thereby preventing the growth of micro-organisms, including aerobic organisms such as moulds or yeasts, and inhibiting oxidative reactions that might otherwise affect the flavour of the beverage concentrate. However, it will be appreciated that the environment does not need to be totally anaerobic, and so small amounts of oxygen may remain.

Prior to the step of filling the aerosol container, the method may comprise pasteurising the beverage or the beverage filtrate. The aerosol container may then be filled under aseptic conditions.

Alternatively, the step of filling the aerosol container may comprise hot filling the aerosol container. Accordingly, the step may comprise raising the temperature of the beverage or the beverage filtrate such that immediately prior to the transfer of the beverage or the beverage filtrate into the aerosol container the temperature of the beverage or the beverage filtrate is preferably at least 72° C., more preferably at least 75° C. and most preferably at least 80° C. The temperature of the beverage or the beverage filtrate can be raised using a heat exchange unit.

It will be appreciated that pasteurisation is a combination of heat and time, and 72° C. for about 20 minutes are believed to be suitable conditions for the present invention. The temperature of the container is important, and so the temperature of the liquid is raised prior to bottling so that the container's temperature is at least 72° C. When hot filling is used, the liquid cools slowly after filling the container, in contrast to flash pasteurisation or tunnel pasteurisation in which the product is both heated and cooled as part of the process, and so the time function is more important in these latter processes.

The aerosol container may comprise a metal can, and preferably an aluminium or steel can. The aerosol container may comprise a lacquer lining.

The headspace may comprise between 5% and 60% of the volume of the aerosol container. Preferably, the headspace comprises between 20% and 50% of the volume of the aerosol container. Most preferably, the headspace comprises between about 35% and 45% of the volume of the aerosol container.

The step of displacing oxygen in the headspace with an inert gas may comprise applying a vacuum to the headspace, and then injecting an inert gas into the headspace. The inert gas may be injected at a pressure of at least 2 bar or 2.5 bar. Preferably, the inert gas is injected at a pressure of at least 3, 4, 5, 6 or 7 bar. Most preferably, the inert gas is injected at a pressure of about 8 bar.

Advantageously, the pressurised gas allows the beverage concentrate to be dispensed from the aerosol container in a steady and controlled stream.

Preferably, the inert gas may comprise nitrogen.

Alternatively, the inert gas may comprise nitrous oxide.

Advantageously, the nitrous oxide is absorbed by the beverage concentrate. This causes the beverage concentrate to foam when it released from the aerosol. Accordingly, in the embodiment where the beverage concentrate is a coffee concentrate the coffee concentrate may be used to produce a foam or froth, such as in a cappuccino-like drink.

After the step of filling the aerosol container with the beverage or the beverage filtrate has been completed the method may comprise fitting the container with an aerosol valve. The step of fitting the container with an aerosol valve is preferably completed prior to the step of displacing oxygen in the headspace with an inert gas. Preferably, the vacuum is applied to the headspace through the aerosol valve. Preferably, the inert gas is pumped into the headspace through the aerosol valve.

The step of sealing the aerosol container preferably comprises closing the aerosol valve.

While the aerosol container maintains the beverage concentrate in a substantially anaerobic and sterile environment it will be understood that it may still be preferred to include an antioxidant in the beverage concentrate. Accordingly, prior to the step of filling the aerosol container, the method may comprise contacting the beverage or the beverage filtrate with an antioxidant. The antioxidant may comprise an ascorbate, a tocopherol, a gallate, an erythorbate and/or a phosphate. Preferably, the antioxidant comprises an ascorbate. The ascorbate may comprise ascorbic acid (Vitamin C), sodium ascorbate, calcium ascorbate, potassium ascorbate, fatty acid esters of ascorbic acid or ascorbyl state. In a preferred embodiment, the antioxidant comprises ascorbic acid.

The amount of the antioxidant added to the beverage or the beverage filtrate may comprise between 0.5 and 50 grams of antioxidant per litre of beverage filtrate. Preferably, the amount of antioxidant added to the beverage or the beverage filtrate comprises between 1 and 25 grams of antioxidant per litre of beverage filtrate. More preferably, the amount of antioxidant added to the beverage or the beverage filtrate comprises between 2 and 20 grams, or 3 and 15 grams of antioxidant per litre of beverage filtrate. Most preferably, the amount of antioxidant used comprises between about 4 and 10 grams of antioxidant per litre of beverage filtrate.

In a preferred embodiment, the beverage concentrate is a tea concentrate and the amount of antioxidant used comprises between about 4 and 10 grams of antioxidant per litre of tea filtrate.

In an alternative preferred embodiment, the beverage concentrate is a coffee concentrate and the amount of antioxidant used comprises between about 0.1 and 10 grams of antioxidant per litre of coffee filtrate, preferably between about 0.25 and 5 grams of antioxidant per litre of coffee filtrate, most preferably between about 0.5 and 2 grams of antioxidant per litre of coffee filtrate.

In a further alternative preferred embodiment, the beverage concentrate is a fruit and/or herb infusion concentrate and the amount of antioxidant used comprises between about 0.1 and 50 grams of antioxidant per litre of fruit and/or herb infusion filtrate, preferably between about 1 and 25 grams of antioxidant per litre of fruit and/or herb infusion filtrate, most preferably between about 4 and 10 grams of antioxidant per litre of fruit and/or herb infusion filtrate.

Preferably, the method comprises diluting the beverage concentrate with water prior to consumption in order to produce a beverage, which can then be consumed.

The method preferably comprises diluting the beverage concentrate with hot water prior to consumption in order to produce a beverage. The beverage preferably comprises a tea, coffee or fruit and/or herb infusion.

Advantageously, in the embodiment where the beverage concentrate is a tea concentrate, the tea which is produced tastes of tea and does not need supplementing with additional flavours. The flavour of tea made using the concentrate can be better than tea made using conventional tea bags because better grades of tea can be used in place of the fannings grade used in tea bags. The tea can be properly brewed for the ideal time period rather than the 10-15 seconds typically allowed for tea bag tea. Tea made from the concentrate will also be initially hotter than tea made using a tea bag as the tea bag cools the hot water more than the concentrate does.

Advantageously, in the embodiment where the beverage concentrate is a coffee concentrate, the coffee which is produced tastes the same as freshly brewed coffee. The flavour of coffee made using the concentrate can be better than instant coffee because the process does not rely on freeze-drying or spray drying which are deleterious to flavour. Coffee made from the concentrate will also be initially hotter than coffee made using ground coffee as the coffee grounds cool the hot water more than the concentrate does.

Advantageously, in the embodiment where the beverage concentrate is fruit and/or herb infusion concentrate, the fruit and/or herb infusion which is produced tastes the same as a freshly prepared fruit and/or herb infusion. The flavour of the fruit and/or herb infusion can be better than a fruit and/or herb infusion prepared the conventional way because the fruit and/or herbs can be allowed to steep for the ideal time. Additionally, a fruit and/or herb infusion made from the concentrate will also be initially hotter than a fruit and/or herb infusion made using fruit and/or herbs as the fruit and/or herbs cool the hot water more than the concentrate does.

The hot water used to dilute the concentrate may be at least 65° C. Preferably, the hot water is at least 70° C., 75° C., 80° C., 85° C., 90° C. or 95° C.

Preferably, the ratio of water to beverage concentrate in the beverage is at least 5:1, 10:1 or 15:1, and more preferably at least 15:1 or 20:1. More preferably, the ratio of water to beverage concentrate in the beverage is at least 25:1, even more preferably at least 30:1 or 35:1.

Preferably, the ratio of water to beverage concentrate is between 30:1 and 50:1. More preferably, the ratio of water to beverage concentrate is between 35:1 and 45:1.

In a preferred embodiment, the beverage concentrate is a tea concentrate and the ratio of water to tea concentrate is between 10:1 and 35:1, more preferably between 15:1 and 30:1, and most preferably between 20:1 and 25:1.

In an alternative preferred embodiment, the beverage concentrate is a coffee concentrate and the ratio of water to coffee concentrate is between 5:1 and 35:1, more preferably between 10:1 and 30:1, and most preferably between 15:1 and 25:1.

In a further alternative embodiment, the beverage concentrate is a fruit and/or herb infusion concentrate and the ratio of water to fruit and/or herb infusion concentrate is between 10:1 and 35:1, more preferably between 15:1 and 30:1, and most preferably between 20:1 and 25:1.

It will be understood that the pH of the beverage concentrate is raised due to the dilution step with water. Preferably, the pH of the diluted beverage is above 4.5. More preferably, the pH of the diluted beverage is above 5.0 or 5.5. Most preferably, the pH of the diluted beverage is above 6.

Advantageously, the acidity of the diluted beverage is below the taste threshold.

The inventor believes that the beverage concentrates are novel per se.

Hence, in accordance with a fifth aspect, there is provided a beverage concentrate obtained or obtainable by the method of the first or third aspects.

In accordance with a sixth aspect, there is provided a tea concentrate obtained or obtainable by the method of the second or fourth aspects.

In accordance with a seventh aspect, there is provided a liquid tea concentrate comprising a stabiliser and one or more preservative, wherein the tea concentrate is configured to produce tea when diluted with water, wherein the ratio of water to tea concentrate is at least 10:1.

Preferably, the ratio of water to tea concentrate is at least 15:1, more preferably at least 20:1.

Preferably, the tea concentrate is a hot tea concentrate. Preferably, the features of the tea concentrate of the seventh aspect are as defined with respect to the method of the second or fourth aspects.

In accordance with an eighth aspect, there is provided a liquid coffee concentrate comprising a stabiliser and one or more preservative, wherein the coffee concentrate is configured to produce coffee when diluted with water, wherein the ratio of water to coffee concentrate is at least 5:1.

Preferably, the ratio of water to coffee concentrate is at least 10:1, more preferably at least 15:1.

Preferably, the coffee concentrate is a hot coffee concentrate. Preferably, the features of the coffee concentrate of the eighth aspect are as defined with respect to the method of the first or third aspects.

In accordance with a ninth aspect, there is provided a liquid fruit and/or herb infusion concentrate comprising one or more preservative, wherein the fruit and/or herb infusion concentrate is configured to produce a fruit and/or herb infusion when diluted with water, wherein the ratio of water to fruit and/or herb infusion concentrate is at least 10:1.

Preferably, the ratio of water to fruit and/or herb infusion concentrate is at least 15:1, more preferably at least 20:1.

Preferably, the features of the fruit and/or herb infusion concentrate of the ninth aspect are as defined with respect to the method of the first or third aspects.

In accordance with an tenth aspect of the invention, there is provided a liquid tea concentrate comprising a stabiliser and being disposed in an aerosol container, wherein the tea concentrate is configured to produce tea when diluted with water, wherein the ratio of water to tea concentrate is at least 10:1.

Preferably, the ratio of water to tea concentrate is at least 15:1, more preferably at least 20:1.

Preferably, the tea concentrate is a hot tea concentrate. Preferably, the features of the tea concentrate of the tenth aspect are as defined with respect to the method of the second aspect.

In accordance with an eleventh aspect of the invention, there is provided a liquid coffee concentrate comprising a stabiliser and being disposed in an aerosol container, wherein the coffee concentrate is configured to produce coffee when diluted with water, wherein the ratio of water to coffee concentrate is at least 5:1.

Preferably, the ratio of water to coffee concentrate is at least 10:1, more preferably at least 15:1.

Preferably, the coffee concentrate is a hot coffee concentrate. Preferably, the features of the coffee concentrate of the eleventh aspect are as defined with respect to the method of the first aspect.

In accordance with a twelfth aspect of the invention, there is provided a liquid fruit and/or herb infusion concentrate being disposed in an aerosol container, wherein the fruit and/or herb infusion concentrate is configured to produce a fruit and/or herb infusion when diluted with water, wherein the ratio of water to fruit and/or herb infusion concentrate is at least 10:1.

Preferably, the ratio of water to fruit and/or herb infusion concentrate is at least 15:1, more preferably at least 20:1.

Preferably, the features of the fruit and/or herb infusion concentrate of the twelfth aspect are as defined with respect to the method of the first aspect.

It will be appreciated that the beverage concentrate of any one of the fifth to twelfth aspects can be dispensed via a vending machine.

Thus, in a thirteenth aspect, therefore, there is provided use of the tea concentrate of the sixth, seventh or tenth aspect in a vending machine to produce tea.

Thus, in a fourteenth aspect, there is provided a method of dispensing hot tea from a vending machine, the method comprising diluting the tea concentrate of the sixth, seventh or tenth aspect with hot water in a vending machine, and dispensing the diluted tea.

Hence, in an fifteenth aspect, there is provided an instant tea vending machine comprising a reservoir filled or adapted to be filled with the tea concentrate according to the sixth, seventh or tenth aspect into a container, and means for contacting the tea concentrate with hot water to thereby produce instant tea.

It will be appreciated that the liquid tea concentrate of the tenth aspect, which is disposed in an aerosol container, can be readily dispensed by a vending machine, as the aerosol itself may provide the power to drive the dispensing. The vending machine preferably comprises a valve arranged to control the dispensing.

In a sixteenth aspect, there is provided a reservoir pre-filled with the tea concentrate of the sixth, seventh or tenth aspect, preferably for use with the vending machine of the fifteenth aspect.

In a seventeenth aspect, therefore, there is provided use of the beverage concentrate of any one of the fifth to twelfth aspects in a vending machine to produce a beverage.

Thus, in an eighteenth aspect, there is provided a method of dispensing a hot beverage from a vending machine, the method comprising diluting the beverage concentrate of any one of the fifth to twelfth aspects with hot water in a vending machine, and dispensing the diluted beverage.

Hence, in a nineteenth aspect, there is provided an instant beverage vending machine comprising a reservoir filled or adapted to be filled with the beverage concentrate according to any one of the fifth to twelfth aspects into a container, and means for contacting the beverage concentrate with hot water to thereby produce a beverage.

It will be appreciated that the liquid beverage concentrate of the tenth, eleventh and twelfth aspects, which are disposed in an aerosol container can be readily dispensed by a vending machine, as the aerosol itself may provide the power to drive the dispensing. The vending machine preferably comprises a valve arranged to control the dispensing.

In a twentieth aspect, there is provided a reservoir pre-filled with the beverage concentrate according to any one of the fifth to twelfth aspects, preferably for use with the vending machine of the nineteenth aspect.

All features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures, in which:

FIG. 1 is a drawing of a vending machine; and

FIG. 2 shows one embodiment of an aerosol production line.

EXAMPLE 1

Manufacture of a Tea Concentrate (Using a Preservative)

The inventor identified three problems that need to be overcome to enable the manufacture of a sugar free concentrated tea. These problems were the formation of tea cream, flavour deterioration of a concentrate due to oxidation, and microbial spoilage. Each of these problems is discussed below.

Strong tea as it cools becomes opaque and milky, and over time the opacity turns into a solid element that precipitates out. This element is known in the industry as "tea cream". Tea concentrates containing these precipitates would be unacceptable. Accordingly, one solution adopted in the prior art is to remove the precipitate and retain only the clarified liquid. This liquid retains the characteristic tea aroma but important elements of the tea flavour including the astringency, due to tannins, as well as caffeine contained in the precipitate and are lost. Another solution used in the prior art is to chemically modify the elements of the tea cream. However, this will also modify the flavour of the tea.

According to the present invention tea is brewed in the normal way, but much stronger than usual. Typically, 1 kg of tea to 4 litres hot water, so 250 g/l rather than the 5-10 g/l typical for tea, i.e. 25-50 times as strong. It will be appreciated that the length of time the tea brews for depends upon the temperature of the hot water. The inventor has found that the tea only needs to be brewed for about 5 minutes when the temperature of the water is approximately 80° C. but conversely the tea needs to be brewed for approximately 20 minutes when the temperature of the water is approximately 60° C.

The tea is strained, to separate the tea leaves from the infusion, and the leaves are gently pressed. The tea is then coarse-filtered while still hot and before the tea cream forms on cooling. The inventor used a diatomaceous earth filter to remove solids from the tea. This process has been found to yield about 2.5 litres of strong tea.

Once the solution starts to cool the tea cream formation is heavy due to the very high strength of the brew. The solution first turns cloudy, looking as though milk has been added, and then separates into two fractions, a relatively clear fraction, and a deposit. Rather than removing the tea cream, the inventor has found that it is possible to hold the deposits in suspension using a gum. The inventor has found that both xanthan and guar gums can be used. In particular, the inventor has had the best results using about 2 g/litre of xanthan gum. It has been observed that using this concentration of xanthan gum effectively holds the tea cream in suspension without affecting the taste or mouth feel of the tea after dilution.

It should be noted that addition of the xanthan gum results in a cloudy concentrate. However, surprisingly when the cloudy concentrate is diluted with hot water, bringing the temperature to above 65° C., a clear solution is obtained, and the cloudiness does not reoccur on cooling due to the dilution factor.

As mentioned above, it is also necessary to achieve a long shelf life of flavour and microbiological stability. The prior art teaches that this may be achieved by heat sterilization or freezing of the concentrate. However, neither of these approaches is appropriate for a concentrate which can be used domestically. Such a concentrate must be stable after opening for many weeks, and a frozen concentrate is too cumbersome.

In accordance with the present invention, stability suitable for home use is achieved by (a) addition of ascorbic acid, at about 10 g/l, (b) sodium benzoate at about 750 mg/l and (c) potassium sorbate at about 750 mg/l.

The addition of the ascorbic acid has a two-fold effect as it is an antioxidant, so prevents oxidative spoilage of flavour, and it reduces the pH to about 4.3. This pH reduction is necessary as the pH has to be below 4.5 to allow the sodium benzoate to function effectively as a microbial preservative.

The sodium benzoate and potassium sorbate act together as antimicrobial agents, with the sodium benzoate being most effective against bacteria and the potassium sorbate being most effective against yeast and mould.

The tea concentrate may then be diluted with hot water for consumption. The inventor has found that people tend to prefer the taste of the tea produced when the tea concentrate is diluted between about 20:1 to 25:1 with hot water. However, people who prefer stronger tea may choose to dilute the concentrate using a ratio of about 15:1 hot water to tea concentrate. Similarly, people who prefer weaker tea may choose to dilute the tea concentrate using a ratio of about 40:1 hot water to tea concentrate. This is easy to measure at home as about a dessertspoon of the concentrate is required in a mug of hot water to give a relatively weak tea and about one and a half desserspoons of the concentrate is required in a mug of hot water to give a relatively strong tea. Accordingly, the 2.5 litres of strong tea yielded may be used to make about 100 litres of hot tea after dilution.

Advantageously, all of the additives are reduced to insignificant levels once the hot water is added to the concentrate at a ratio of about 40:1. The acidity, which is generally undesirable in tea but necessary for microbial stabilisation, is reduced by dilution below the taste threshold to a pH of about 6. These advantages occur due to the high strength of the concentrate.

It should be noted that this high strength is achieved by brewing tea in the normal way without recourse to processes like reduced pressure evaporation, which is deleterious to flavour no matter how carefully it is carried out.

EXAMPLE 2

Stability Trials

Tea concentrate made according to the method outlined in example 1 was subjected to stability trials. The tea concentrate was left in a sealed container and was checked at regular intervals over a period of 3 months. The tea concentrate made in example 1 was found to be stable, i.e. the tea cream stayed in suspension and microbial growth was prevented. Additionally, taste tests confirmed that the taste of tea made by diluting the concentrate had not deteriorated to any noticeable degree over the course of the trial.

EXAMPLE 3

Iced Tea

While example 1 focuses on a concentrate to produce a hot tea it will be appreciated that the concentrate could also be used to produce an iced tea. The iced tea could be produced by simply diluting the concentration of example 1 about 20:1 with cold water and ice for consumption.

However, as explained above, diluting the concentrate with cold water will result in a cloudy iced tea being produced. Accordingly, if the user wanted to produce a clear iced tea they could dilute the concentrate with about a tablespoon of boiling water and then top the solution up with cold water and ice for consumption. This will produce a clear iced tea.

EXAMPLE 4

Vending Machine Tea

FIG. 1 shows a vending machine 2 which can provide a user with tea made using a concentrate of the type produced in example 1. The vending machine 2 has a reservoir 4 which is filled with tea concentrate 6. The reservoirs 4 can be sold pre-filled with the concentrate 6, or topped up with fresh concentrate 6 when empty.

When a user inputs adequate money into the coin slot 8 and presses the appropriate button 10 then the machine will dispense the appropriate amount of tea concentrate 6, about a dessertspoon full, into a paper or plastic cup 12. Depending upon which button the user presses, the machine 2 may also add milk and/or sugar to the cup. The machine 2 then fills the cup 12 with hot water. The cup 12 containing the hot tea will then be lowered into the dispensing section 14 where it may be taken by the user. Accordingly, a vending machine dispenses a hot tea made from the concentrate obtained in example 1.

EXAMPLE 5

Manufacture of a Further Tea Concentrate (Using Aerosolisation)

The tea is brewed, strained, coarse-filtered and xanthan gum and ascorbic acid are added to the tea filtrate as described in Example 1.

The tea filtrate 16 may then be filled into aerosol containers 30. A schematic diagram of a suitable production line or apparatus 18 for filing the containers 30 is shown in FIG. 2.

The production line 18 comprises a reservoir 20 containing a supply of the tea filtrate 16. A pipe 22 transports the tea filtrate 16 through a heat exchange unit 24. The heat exchange unit 24 is shown as comprising an inlet 26, which transports hot water or steam into the heat exchange unit 24, and an outlet 28, which transports the cooler water or stream away therefrom. The heat exchange unit 24 is configured to heat the tea filtrate 16 to about 80° C.

After the tea filtrate 16 has passed through the heat exchange unit 24, the pipe 22 discharges the tea filtrate 16 in measured amounts into aerosol containers 30 on a conveyor belt 32, leaving approximately 40% of the volume as a headspace.

As the containers 30 are transported along the conveyor belt 32, an aerosol valve 34 is fitted to each container 30 at a first station 36. A vacuum is applied through the open valve 34 to remove the air from the headspace at a second station 38, and then nitrogen gas is injected at a pressure of about 8 or 9 bar and the valve 34 closed at a third station 40. The aerosolised container 30 is then date-stamped, inspected and packaged.

The inert atmosphere in the container 30 serves several purposes. Firstly it reduces the amount of oxygen in the headspace, thereby inhibiting the growth of organisms such as moulds or yeasts. Secondly for similar reasons any oxidative reactions that might contribute to development of off-flavours are inhibited by the reduction of oxygen, which is a useful support to the addition of ascorbic acid as antioxidant. Finally the most useful aspect is that the pressurized gas allows liquid to be dispensed from the container through the valve in a steady and controlled stream (not a spray) without any ingress of atmospheric air, so that the anaerobic and sterile conditions can be maintained throughout the life of the product as it is consumed.

The tea concentrate may then be diluted with hot water for consumption, as explained in example 1.

EXAMPLE 6

Stability Data for a Tea Concentrate

The aerosolised tea concentrate was prepared according to the method of Example 5. Tea concentrate from the aerosol container was tested on 27 Jul. 2015, and the results are shown in table 1.

TABLE 1

Results of microbiological testing of tea concentrate stored in a 200 ml aerosol can conducted on 27 Jul. 2015

| Parameter | Result | Unit |
| --- | --- | --- |
| Microbiology Yeast | NIL | cfu/100 μl |
| Microbiology Bacteria | NIL | cfu/100 μl |
| Microbiology Mould | NIL | cfu/100 μl |

Tea concentrate taken from the same aerosol container was tested again on 27 Oct. 2015, and the results are shown in table 2.

TABLE 2

Results of further microbiological testing of tea concentrate stored in a 200 ml aerosol can conducted on 27 Oct. 2015

| Parameter | Result | Unit |
| --- | --- | --- |
| Microbiology Yeast | NIL | cfu/100 ul |
| Microbiology Bacteria | NIL | cfu/100 ul |
| Microbiology Mould | NIL | cfu/100 ul |

Both tests showed that the samples did not contain detectable levels of yeast, bacteria or mould. Accordingly, this shows that tea stored within the aerosol remained sterile within the container even after tea concentrate had been removed therefrom three months previously.

Additionally, at the same time as the second microbial analysis was carried out some of the tea concentrate was diluted in hot water for consumption. It was noted that the prepared drink was deep brown in colour with typical English tea notes on the nose and palate. No degradation in taste or smell was detected.

EXAMPLE 7

Manufacture of a Coffee Concentrate (Using Aerosolisation)

According to the present invention coffee is brewed in the normal way, but much stronger than usual. Typically, about 300 g of coffee per litre of hot water is used. As with the tea concentrate discussed above, the length of time the coffee brews for depends upon the temperature of the hot water. A cold brew coffee can also be made by infusing the coffee grains overnight in cold water, giving a softer and less bitter tasting coffee that is particularly well suited for iced coffee. However, typically a water temperature of about 80° C. is used and the coffee is allowed to brew for about 10 minutes.

The coffee is strained, to separate the coffee grounds from the infusion, and the coffee grounds are gently pressed. The coffee is then coarse-filtered while still hot and before any deposit, forms. The inventor used a diatomaceous earth filter to remove solids from the coffee. This process has been found to yield about 350 ml of extract per litre of water used.

Over time the strong coffee flocculates and separates into a liquid and more solid probably colloidal fraction. Rather than removing the solids, the inventor has found that it is preferable to hold the deposits in suspension using a gum. As explained above, the inventor has found that both xanthan and guar gums can be used. In particular, the inventor has had the best results using about 2 g/litre of xanthan gum. It has been observed that using this concentration of xanthan gum effectively holds the solids in suspension without affecting the taste or mouth feel of the coffee after dilution.

As mentioned above, it is also necessary to achieve a long shelf life of flavour. Accordingly, ascorbic acid is added to reduce the pH of the coffee filtrate to below 4.5. The inventor has found that strong coffee has a pH of about 4.8 and so only about a gram per litre of filtrate is needed.

The coffee filtrate may then be filled into aerosol containers. The process for filing the aerosol containers with the coffee filtrate is the same as that described in Example 5 for the tea filtrate, with reference to FIG. 2.

Once the coffee filtrate is disposed in an aerosol container it is stable. Advantageously, all of the additives are reduced to insignificant levels once the hot water is added to the concentrate at a ratio of about 15:1. These advantages occur due to the high strength of the concentrate.

EXAMPLE 8

Iced Coffee

Similar to the iced tea produced in example 3, the concentrate produced in example 7 could be used to produce iced coffee. This could be produced by simply diluting the concentration of example 7 about 15:1 with cold water and ice for consumption.

EXAMPLE 9

Manufacture of a Cappuccino Concentrate (Using Aerosolisation)

A coffee concentrate is manufactured according to the method outlined in Example 7. The only difference is that instead of using nitrogen gas to fill the aerosols nitrous oxide ($NO_2$) is used at a pressure of 8 or 9 bar. Unlike nitrogen gas, the nitrous oxide will dissolve in the coffee and foams when the pressure is released, such as when a portion of the concentrate is dispensed. The foamed concentrate can then be mixed with hot water at a ratio of about 15:1 to give a cappuccino-type drink.

EXAMPLE 10

Manufacture of an Infusion (Using Aerosolisation)

According to the present invention an infusion is prepared by infusing herbs (fresh or dried) and/or fruits (generally dried) in hot water in just the same way as is done for tea. As with the tea, about 250 g of fruit and herbs per litre of hot water is used.

The infusion is strained, to separate the fruit and herbs from the infusion, and the fruit and herbs are gently pressed. The infusion is then coarse-filtered while still hot. The inventor used a diatomaceous earth filter to remove solids from the infusion. This process has been found to yield about 0.6 to 0.7 litres of a strong infusion per litre of water used.

The infusion does not generally result in solids being precipitated, and so it is not normally necessary to use a stabiliser for a fruit or herb infusion. However, where the fruits used to make the infusion contain large amounts of pectin, such as pears, apples, guavas, plums, gooseberries and citrus fruits, it can be necessary to remove pectins using a pectolytic enzyme, to prevent the strong infusion from setting like jam and thus being impossible to dispense.

The amount of enzyme needed has to be established by trials and is proportional to the amount of pectin present. The liquid enzyme is stirred into the infusion once it has cooled to about 30° C. The inventor has found that the enzyme can be deactivated by high temperatures but is weakened by low temperatures, so a tepid environment of about 30° C. is ideal. The enzyme will cause the infusion to separate into a clear liquid fraction and an opaque pectin based flocculation which is then removed by racking and filtering. If the separation fails to occur then more enzyme is added until it does.

To achieve a long shelf life of flavour it is still necessary to reduce the pH of the infusion to below 4.5. Depending on the fruits used in the infusion the pH may already be fairly low, but most herb infusions and especially fresh herb infusions require ascorbic acid addition in the range of 1-4 wt %, i.e. about 10 to 40 grams per litre of the filtrate, and some also require a similar addition of another food acid such as citric acid, in a similar measure. There are two reasons for this, the first is that the inventor has found that the taste of herb infusions can be improved by a touch of acidity and that citric acid imparts a better flavour than ascorbic acid for this purpose. Additionally, the inventor has also found that particularly when nettle leaves are used to make the infusion the addition of citric acid can further protect the concentrate from oxidation.

The infusion may then be filled into aerosol containers. The process for filing the aerosol containers with the herb infusion filtrate is the same as that described in Example 5 for the tea filtrate, with reference to FIG. 2.

Once the infusion is disposed in an aerosol container it is stable. Advantageously, all of the additives are reduced to insignificant levels once the water is added to the concentrate at a ratio of about 20:1. These advantages occur due to the high strength of the concentrate. Additionally, since a stabiliser is not used the infusion can be diluted with cold water without producing a cloudy drink.

The inventor believes that the method of the invention and the concentrate per se are innovative for several reasons. There is a technical prejudice in the prior art which teaches that tea cream must be removed from a tea concentrate. However, the inventor has found that this is not necessary as the tea cream can be held in suspension leading to an improved flavour of the final product. Additionally, the inventor has found a way of preserving the flavour of the concentrate and preventing microbial spoilage of the tea, without needing to resort to freezing or heat treating the concentrate, thus enabling the concentrate to be stored conveniently for home use.

The flavour of tea made using the concentrate of the present invention can be better than tea made using tea bags because better grades of tea can be used in place of the fannings grade used in tea bags. The tea can be properly brewed for the ideal time period rather than the 10-15 seconds typically allowed for tea bag tea. Tea made from the concentrate will also be initially hotter than tea made using a tea bag as the tea bag cools the hot water more than the concentrate does.

The tea concentrate can be dispensed using a hand pump dispenser and using this it is a simple matter both to control the amount of concentrate used, and to vary the strength of the final brew to suit individual taste which cannot be done with tea bags. Alternatively, the tea concentrate can be dispensed via a vending machine to make tea.

The inventor has also found that the teachings of the present invention can be extended to further beverages, such as coffee or fruit and herb infusions. Accordingly, it is also possible to obtain concentrates of these beverages which can be dispensed using a hand pump dispenser or via a vending machine to make coffee or a fruit and herb infusion.

In summary, the process of the invention is innovative because it provides a novel solution to the difficulties of providing a beverage concentrate, and does so in a way that gives specific benefits to the consumer such as greatly improved taste, no added sugar and convenient storage.

What is claimed is:

1. A method of producing a beverage concentrate, the method comprising:
   contacting at least one of a plant material and a plant extract with water at a temperature of at least 60° C. to produce a beverage, wherein the concentration of the at least one of the plant material and the plant extract in the hot water is at least 100 grams per litre;

filtering the beverage when it is at a temperature of at least 50° C. to produce a beverage filtrate;

contacting the beverage or the beverage filtrate with a stabilizer to retain a solid in suspension, wherein the stabilizer is selected from the group consisting of kappa carrageenan, iota carrageenan, lamba carrageenan, locust bean gum, oat gum, guar gum, tragacanth, acacia gum, xanthan gum, karaya gum, tara gum, gellan gum, and gum ghatti, and wherein an amount of the stabiliser added to the beverage or to the beverage filtrate is from 0.1 grams to 10 grams of the stabilizer per liter of the beverage or the beverage filtrate; and producing a microbiologically stable beverage concentrate from the beverage or the beverage filtrate by contacting the beverage or the beverage filtrate with one or more preservative wherein the one or more preservative comprises ascorbic acid and the amount of ascorbic acid added to the beverage or the beverage filtrate comprises between 0.5 and 50 grams of ascorbic acid per liter of beverage or beverage filtrate and causes the pH of the beverage or beverage filtrate to be reduced to a pH of below 4.5.

2. The method of claim 1, wherein the concentration of the at least one of the plant material and the plant extract in the hot water is at least 150 grams per litre.

3. The method of claim 1, wherein the beverage concentrate is a tea concentrate and wherein the at least one of the plant material and the plant extract comprises at least one of the leaves and the leaf buds of *Camellia sinensis*.

4. The method of claim 1, wherein the beverage concentrate is a coffee concentrate and wherein the at least one of the plant material and the plant extract comprises the seeds or beans of *Coffea arabica* or *Coffea canephora*.

5. The method of claim 1, wherein the beverage concentrate is at least one of a fruit and an herb infusion concentrate.

6. The method of claim 1, wherein the water contacted with the at least one of the plant material and the plant extract is at least 70° C., and wherein the beverage is filtered while the beverage is at least 60° C.

7. The method of claim 1, wherein the step of filtering the beverage comprises straining the beverage and coarse-filtering the beverage.

8. The method of claim 1, wherein the step of producing a microbiologically stable beverage concentrate from the beverage or the beverage filtrate comprises an additional step of one of (i) pasteurising the beverage or the beverage filtrate to produce a pasteurized beverage or pasteurized beverage filtrate, filling an aerosol container with the pasteurized beverage or the pasteurized beverage filtrate, displacing oxygen in a headspace of the aerosol container with an inert gas, and sealing the aerosol container, or (ii) hot filling the aerosol container with the beverage or the beverage filtrate, displacing oxygen in the headspace of the aerosol container with the inert gas, and sealing the aerosol container.

9. The method of claim 8, further comprising raising a temperature of the beverage or the beverage filtrate such that immediately prior to transfer of the beverage or the beverage filtrate into the aerosol container the temperature of the beverage or the beverage filtrate is at least 72° C. to 80° C.

10. The method of claim 8, wherein displacing oxygen in the headspace with the inert gas comprises applying a vacuum to the headspace, and then injecting the inert gas into the headspace.

11. The method of claim 8, wherein the inert gas is injected at a pressure of at least 2 bar to 2.5 bar, and wherein the inert gas is nitrogen or nitrous oxide.

12. The method of claim 1, wherein the one or more preservative does not comprise sugar.

13. The method of claim 12, wherein the one or more preservative comprises an antimicrobial agent, and the antimicrobial agent comprises an antifungal agent and an antibacterial agent.

14. The method of claim 13, wherein the antifungal agent comprises a sorbate selected from the group consisting of sorbic acid, sodium sorbate, potassium sorbate, and calcium sorbate, and wherein the antibacterial agent comprises a benzoate selected from the group consisting of: benzoic acid, sodium benzoate, potassium benzoate, calcium benzoate, ethylparaben, sodium ethyl para-hydroxybenzoate, propylparaben, sodium propyl para-hydroxybenzoate, methylparaben, and sodium methyl para-hydroxybenzoate.

15. The method of claim 13, wherein the amount of the antimicrobial agent added to the beverage or the beverage filtrate is from 100 milligrams to 3000 milligrams of the antimicrobial agent per liter of the beverage or the beverage filtrate.

16. A method of producing a beverage, the method comprising producing the beverage concentrate according to the method of claim 1, and further comprising a step of diluting the beverage concentrate with hot water prior to consumption in order to produce a beverage, wherein the ratio of water to beverage concentrate in the beverage is at least 20:1, and wherein the pH of the beverage concentrate is increased on dilution with hot water to a pH above 4.5.

17. A device for producing tea, comprising an aerosol container and a liquid tea concentrate comprising a stabiliser and disposed in the aerosol container, wherein the tea concentrate is produced according to the method of claim 3.

18. A device for producing coffee, comprising an aerosol container and a liquid coffee concentrate comprising a stabiliser and being disposed in the aerosol container, wherein the coffee concentrate is produced according to the method of claim 4.

19. A device for producing a liquid fruit infusion, comprising an aerosol container and a liquid fruit infusion concentrate being disposed in the aerosol container, wherein the fruit infusion concentrate is produced according to the method of claim 5.

20. The method of claim 1, wherein the amount of ascorbic acid added to the beverage or the beverage filtrate comprises between 1 and 25 grams of ascorbic acid per litre of beverage filtrate and causes the pH of the beverage or beverage filtrate to be reduced to a pH of below 4.3.

* * * * *